(12) United States Patent
Blasch et al.

(10) Patent No.: US 6,224,115 B1
(45) Date of Patent: *May 1, 2001

(54) BULKHEAD FITTING FOR UNDERGROUND SUMP

(75) Inventors: Lawrence R. Blasch, Cincinnati, OH (US); Frank G. Lamping, Bellevue, KY (US)

(73) Assignee: Delaware Capital Formation, Inc., Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,784

(22) Filed: Oct. 8, 1996

(51) Int. Cl.[7] .............................. B65B 31/06; F16L 41/00
(52) U.S. Cl. ...................... 285/139.2; 285/196; 285/216; 285/208
(58) Field of Search ............................. 285/196, 139.1, 285/139.2, 139.3, 211, 212, 204, 214, 215, 216, 217, 140.1, 208, 209, 210, FOR 143, 338, 346

(56) References Cited

U.S. PATENT DOCUMENTS

| | | | |
|---|---|---|---|
| 548,706 | * 10/1895 | Gundermann | 285/212 |
| 621,108 | * 3/1899 | Leonard | 285/215 |

(List continued on next page.)

FOREIGN PATENT DOCUMENTS

| | | | |
|---|---|---|---|
| 940125 | 4/1981 | (DE) | 285/45 |
| 4014684 | 9/1990 | (DE) . | |
| 295897 U | 11/1991 | (DE) | 285/192 |
| 200866 | 7/1993 | (DE) | 285/192 |
| 85934 | 10/1958 | (DK) | 285/192 |
| 494391 | 5/1982 | (FR) | 285/192 |
| 675879 | 10/1992 | (FR) | 285/192 |
| 115310 | * 12/1917 | (GB) | 285/196 |
| 505692 | * 5/1939 | (GB) | 285/217 |
| 512256 | * 8/1939 | (GB) | 285/217 |
| 424338 | 6/1948 | (IT) | 285/45 |
| 85527 | 7/1978 | (JP) | 285/192 |
| 85968 | 3/1936 | (SE) | 285/45 |
| 9007074 | 6/1990 | (WO) . | |
| 9320372 | 10/1993 | (WO) . | |

OTHER PUBLICATIONS

Promax, Inc., Promax Protection Product Guide/Price List, 1994, New Castle, Delaware.
Environ Products, Inc., Environ Products Price List, Publication No. PL–1007, Jun. 1, 1994, Loinville, Pennsylvania.
Advanced Polymer Technology, Inc., Advanced Flexible Underground Piping System, 1995, Elkhart, Indiana.
Total Containment . . . Pioneering Secondary Containment Systems For Future Generations, PB100 Apr. 1995, Oaks, Pennsylvania.
Total Containment, "Delivering the Difference", 1996, Oaks, Pennsylvania.
Advanced Polymer Technology, Inc., Quick–Set™ Modular Tank Sump System, Publication No. TS201, Aug. 1, 1993.

(List continued on next page.)

Primary Examiner—Eric K. Nicholson
(74) Attorney, Agent, or Firm—Dinsmore & Shohl LLP

(57) ABSTRACT

An entry fitting having a cylindrical portion and a conical portion including a seal disposed about the body of the entry fitting. An axial displacement member urges the seal along the conical portion to achieve a relatively wide range of sealing force. The entry fitting can include a shield positioned on the exterior of a sump to provide an access space for displacement of the entry fitting toward the exterior of the sump to allow removal and replacement of the seal without first having to remove backfill from the exterior of the sump.

40 Claims, 3 Drawing Sheets

U.S. PATENT DOCUMENTS

| | | | |
|---|---|---|---|
| 887,850 | * | 5/1908 | Rollins .................................. 285/196 |
| 980,901 | * | 1/1911 | Ballantyne ............................ 285/208 |
| 1,978,958 | * | 10/1934 | Robinson .............................. 285/212 |
| 2,132,636 | * | 10/1938 | Maahs ................................... 285/216 |
| 2,277,885 | * | 3/1942 | Rodanet ................................ 285/212 |
| 2,320,636 | * | 6/1943 | Miller .................................... 285/215 |
| 2,348,490 | * | 5/1944 | Newman ............................ 285/139.2 |
| 2,454,465 | * | 11/1948 | Leo ................................... 285/139.2 |
| 2,779,609 | | 1/1957 | Portney et al. ....................... 285/192 |
| 2,827,639 | * | 3/1958 | Schmidt ................................ 285/204 |
| 3,759,280 | | 9/1973 | Swanson ............................... 285/236 |
| 3,863,960 | * | 2/1975 | Andersson ......................... 285/140.1 |
| 3,958,313 | | 5/1976 | Rossborough ....................... 285/230 |
| 3,973,789 | * | 8/1976 | Kunz et al. ........................... 285/196 |
| 4,086,736 | | 5/1978 | Landrigan ............................. 285/192 |
| 4,094,358 | * | 6/1978 | Neveux .............................. 285/140.1 |
| 4,141,477 | * | 2/1979 | Hengesbach ...................... 285/140.1 |
| 4,203,190 | | 5/1980 | Temple et al. ........................ 285/230 |
| 4,411,458 | * | 10/1983 | Strunk et al. ......................... 285/196 |
| 4,478,437 | | 10/1984 | Skinner ................................. 285/236 |
| 4,775,073 | | 10/1988 | Webb . | |
| 4,805,444 | | 2/1989 | Webb . | |
| 4,932,257 | | 6/1990 | Webb . | |
| 4,971,477 | | 11/1990 | Webb et al. . | |
| 5,040,408 | | 8/1991 | Webb . | |
| 5,060,509 | | 10/1991 | Webb . | |
| 5,096,206 | | 3/1992 | Andre et al. ........................ 285/236 |
| 5,098,221 | | 3/1992 | Osborne . | |
| 5,129,684 | | 7/1992 | Lawrence et al. . | |
| 5,150,928 | * | 9/1992 | Lodder ................................. 285/196 |
| 5,257,652 | | 11/1993 | Lawrence . | |
| 5,263,794 | | 11/1993 | Webb . | |
| 5,265,652 | | 11/1993 | Brunella ............................ 285/139.1 |
| 5,295,760 | | 3/1994 | Rowe . | |
| 5,297,896 | | 3/1994 | Webb . | |
| 5,333,490 | | 8/1994 | Webb . | |
| 5,345,813 | | 9/1994 | Flessas . | |
| 5,366,318 | | 11/1994 | Brancher . | |
| 5,372,454 | | 12/1994 | Lawrence . | |
| 5,398,976 | | 3/1995 | Webb . | |
| 5,407,300 | | 4/1995 | Guindon et al. . | |
| 5,431,457 | | 7/1995 | Youngs . | |
| 5,490,419 | | 2/1996 | Webb . | |
| 5,494,374 | | 2/1996 | Youngs et al. . | |
| 5,527,130 | | 6/1996 | Webb . | |
| 5,553,971 | | 9/1996 | Osborne . | |
| 5,567,083 | | 10/1996 | Osborne . | |
| 5,704,656 | * | 1/1998 | Rowe ................................. 285/139.3 |
| 5,826,919 | | 10/1998 | Bravo et al. ......................... 285/236 |
| B1 5,263,794 | | 1/1996 | Webb . | |

OTHER PUBLICATIONS

Advanced Polymer Technology, Inc., Poly–Tech™ Flexible Entry Boots, Publication No. FEB201, Aug. 1, 1993, Elkhart, Indiana.

Advanced Polymer Technology, Inc., Poly–Tech™ Split Dispenser Sumps, PDS201, Aug. 1, 1993, Elkhart, Indiana.

Environ, GeoFlex™ Piping System, Publication No. PM–0402, Feb. 1, 1994, Lionville, Pennsylvania.

Environ, Tank Sump Manual, Publication No. PM–0104, Jul. 1, 1994, Lionville, Pennsylvania.

Total Containment, Dispenser Sumps, Publication No. DS800, Sep. 1, 1994, Oaks, Pennsylvania.

Total Containment, U.S. Price Manual, Publication No. PM1500, Apr. 1, 1995, Oaks, Pennsylvania.

Environ, Dispenser Containment Manual, Publication No. P–DCM–4030, May 15, 1995, Lionville, Pennsylvania.

Total Containment, Multisided Tank Sumps, Publication No. SR200, Jun. 1, 1995, Oaks, Pennsylvania.

Total Containment: Tank Sumps: Fiberglass/Cuffed Polyethylene, Publication No. SR300, Jun. , 1995, Oaks, Pennsylvania.

Advanced Polymer Technology, Inc., Poly–Tech™ TS–4230 Standard Burial Tank Sump, Publication No. TS42, Sep. 15, 1995, Elkhart, Indiana.

Environ, Installation Instructions Flexible Entry Boots, Publication No. P–FBI–5070, Mar. 1, 1995, Lionville, Pennsylvania.

Environ, Product Price List, Publication No. P–APB–1010, Aug. 15, 1996, Lionville, PA.

Environ, The GeoFlex System, Publication No. P–APB–2010, Oct. 1, 1996, Lionville, PA.

* cited by examiner

BULKHEAD FITTING FOR UNDERGROUND SUMP

TECHNICAL FIELD

This invention relates generally to the field of bulkhead or entry fittings used in underground sumps, and more particularly to an entry fitting which achieves an increased range of adjustable sealing force.

BACKGROUND OF THE INVENTION

Entry fittings are used in underground sumps to seal the interface between an access opening of the sump and a pipe extending into the sump through the access opening. Entry fittings are designed to prevent the flow of a fluid, such as gasoline, which has leaked into the sump, from entering the surrounding ground, and for preventing the flow of ground water into the sump.

An underground sump can require one or more such entry fittings depending upon the number of fuel conduits entering and exiting the sump. Access openings are usually formed in the sump at the installation site. Due to varying conditions in the field, and of the sump itself, an access opening can sometimes be out-of-round, or have an irregular shape. Conventional entry fittings, however, have a relatively fixed or small range of sealing force, and will only properly seal when used with an access opening that has a regular shape, and also a certain diameter. Thus, if an irregular access opening is formed in a sump, or the diameter is slightly larger than specified for the particular entry fitting size, either a larger hole must be formed and a larger entry fitting utilized, or the sump must be discarded.

After an entry fitting has been initially installed, the seal eventually ages and takes a compression set. Slight movement of the pipe or thermal expansion and contraction can result in leakage about the seal. When this occurs, conventional entry fittings must be entirely replaced due to the lack of or the relatively small range of adjustable sealing force provided by such entry fittings.

There are several conventional entry fitting designs in use. One such entry fitting includes a rubber boot have a planar portion and a tubular portion, the tubular portion being conjoint with and perpendicular to the planar portion. The planar portion is positioned on the exterior of the sump wall and contains bolts which extend through a plurality of holes drilled in the sump and through a compression ring positioned on the interior of the sump wall. Nuts threadedly engage the bolts and pull the planar portion against the exterior of the sump wall. The tubular portion extends into the sump through the access opening, and is sealingly clamped to the pipe. This type of entry fitting does not allow a range of adjustable sealing force between the planar portion and the sump wall, and requires considerable installation time due to the required drilling of holes, and tightening of the requisite nuts and bolts. Further, if the boot develops a leak, the entire entry fitting must be replaced, since there is not a separate seal separable from the entry fitting. Further, replacement of the entry fitting may necessitate removal of backfill from the exterior of the sump to permit withdrawal and replacement of the boot.

Another conventional entry fitting currently in use includes a boot which is positioned in the access opening, and a rigid plastic insert which is forced into the boot to be concentric with the access opening and radially urge the boot against the edge of the access opening. However, the rigid plastic insert has a predetermined size, and thus the boot and insert require a fairly specific size opening. Further, if the boot develops a leak, the entire boot must be replaced as there is no mechanism for increasing the radial force exerted by the plastic insert.

It is apparent that an entry fitting which achieves an increased range of adjustable sealing force and allows flexibility in the size and shape of access openings in which it can be used, which allows replacement of a relatively inexpensive seal without replacement of the entire entry fitting, and which can be replaced without requiring removal of backfill from the exterior of the sump would be desirable.

SUMMARY OF THE INVENTION

It is one object of this invention to provide an entry fitting which achieves a wide range of adjustable sealing force.

It is another object of this invention to provide an entry fitting which can seal a relatively large range of access opening diameters.

It is another object of this invention to provide an entry fitting which can effectively seal irregular shaped access openings, and which can later be adjusted to reseal an access opening which has begun to leak.

It is still another object of this invention to provide an entry fitting in combination with a shield which allows replacement of the entry fitting or the entry fitting seal without requiring removal of backfill from the exterior of the sump.

It is yet another object of this invention to provide an entry fitting which allows replacement of a relatively inexpensive seal rather than an entire entry fitting.

It is still another object of this invention to allow easy replacement of a seal without requiring unclamping and reclamping of an end of the entry fitting.

These and other objects of this invention are achieved with an entry fitting having a body with an exterior surface in which a first portion of the surface has a first radius, a second portion of the surface has a second radius, and the second radius is greater than the first radius. A transition portion of the exterior surface of the entry fitting is positioned between the first portion and the second portion, and the transition portion has a greater radius than the first portion and a smaller radius than the second portion. A seal is circumferentially positioned about the body, and provides a sealing interface between the body and a sump access opening. An axial displacement member such as a nut is positioned about the body and urges the seal axially along the exterior surface of the body. As the seal is axially moved against the transition portion, the seal is radially urged outward against the edge of the access opening. The exterior surface of the body which forms the transition portion has an increasing radius in a direction toward the second portion. Thus the transition portion can be adjusted with respect to the access opening to provide a seal for a relatively large range of access opening diameters. Further, the transition portion can be axially adjusted with respect to the access opening to provide an adjustable range of sealing force.

According to one embodiment of this invention, a seal is positioned about the entry fitting body and contains an annular groove which closely receives an edge of the sump wall forming the access opening. A first circumferential portion of the interior surface of the seal conforms to the contour of the transition portion, while a second circumferential portion of the interior surface of the seal conforms to the first portion of the surface.

According to another embodiment of this invention, a shield having a first end and a second end is provided which is positioned on the exterior of the sump wall. The shield defines an internal access space intermediate the first and second ends. The access space is disposed about an axial portion of the pipe and has a diametral dimension larger than the corresponding diametral dimension of the entry fitting. The access space has an axial dimension sufficient to allow displacement of a portion of the entry fitting into the access space. The first end of the shield circumscribes the access opening and is in proximity to the wall so as to inhibit the flow of backfill material into the access space between the shield and the wall. The second end of the shield circumscribes the pipe so as to inhibit the flow of backfill into the access space between the shield and the pipe. The shield is removably fixed with respect to the pipe so as to selectively prevent relative axial displacement between the pipe and the shield and to secure the position of the shield relative to the wall.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENTS

Figure 1:
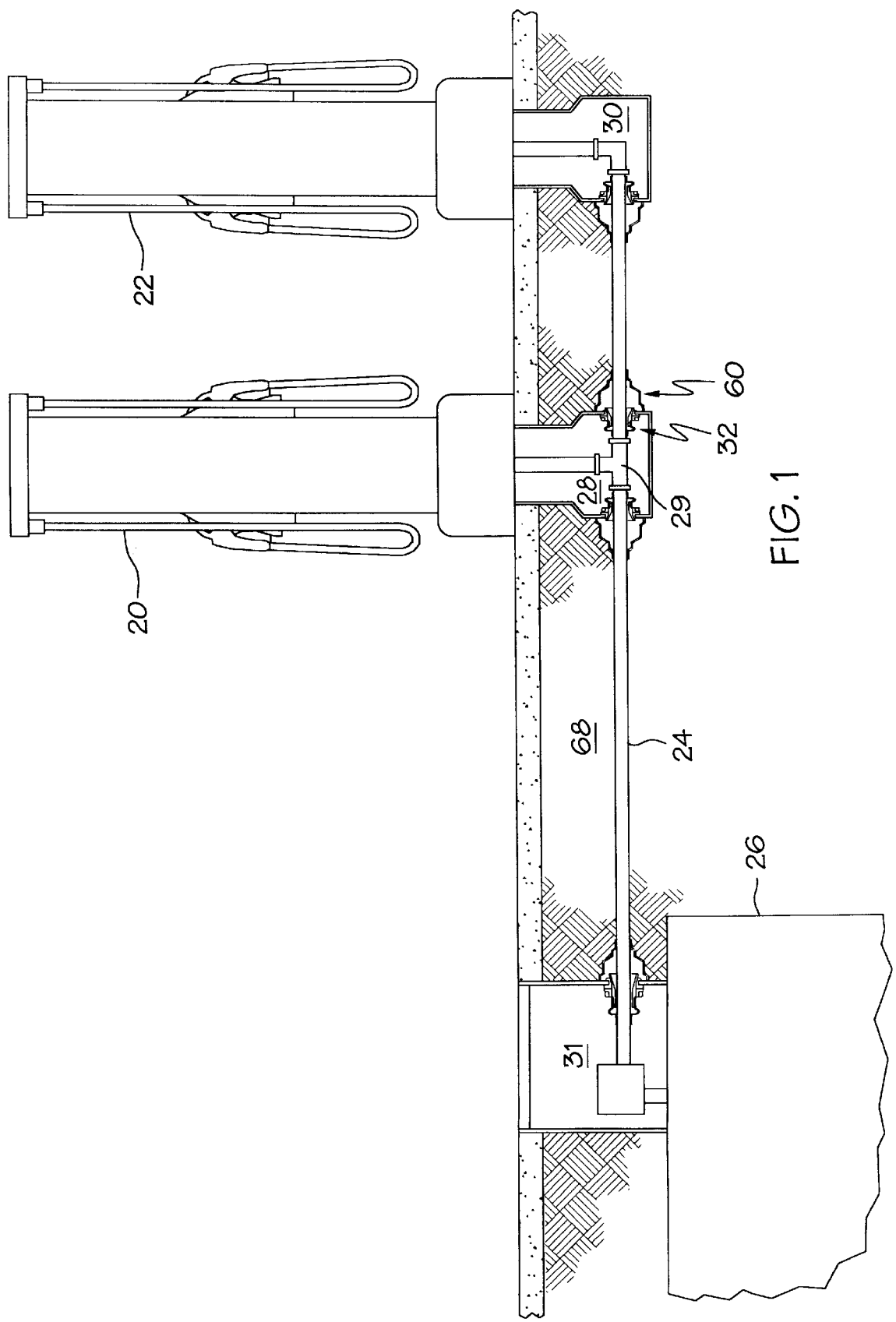
FIG. 1 is a schematic cross-sectional view of a fuel dispensing system showing an entry fitting according to one embodiment of this invention.

Referring now to the drawings, FIG. 1 shows a schematic view of a fuel dispensing system. Fuel dispensers 20 and 22 are in communication with fuel conduit 24 which in turn is in communication with underground fuel tank 26. Upon demand, fuel flows from underground fuel tank 26 through fuel conduit 24 to fuel dispensers 20 and 22. A sump, such as sumps 28 and 30, surround each location where it is necessary to provide fuel conduit 24 with a fitting. Sump 28 captures fuel which can leak from fitting 29 or fuel dispenser 20 and prevents such fuel from entering backfill 68. An entry fitting 32 is positioned at each access opening in the wall of sump 28. Entry fitting 32 provides a seal between conduit 24 and sump 28. Shield 60 is positioned on the exterior of sump 28 and prevents backfill 68 from surrounding the exterior of sump 28 in the area of entry fitting 32. The access space provided by shield 60 enables axial movement of entry fitting 32 outside of sump 28, as described in more detail below, and replacement of a seal associated with entry fitting 32 without removal of backfill 68. A similar entry fitting 32 is provided in sump 30 and access 31 to seal respective access openings.

Figure 2:
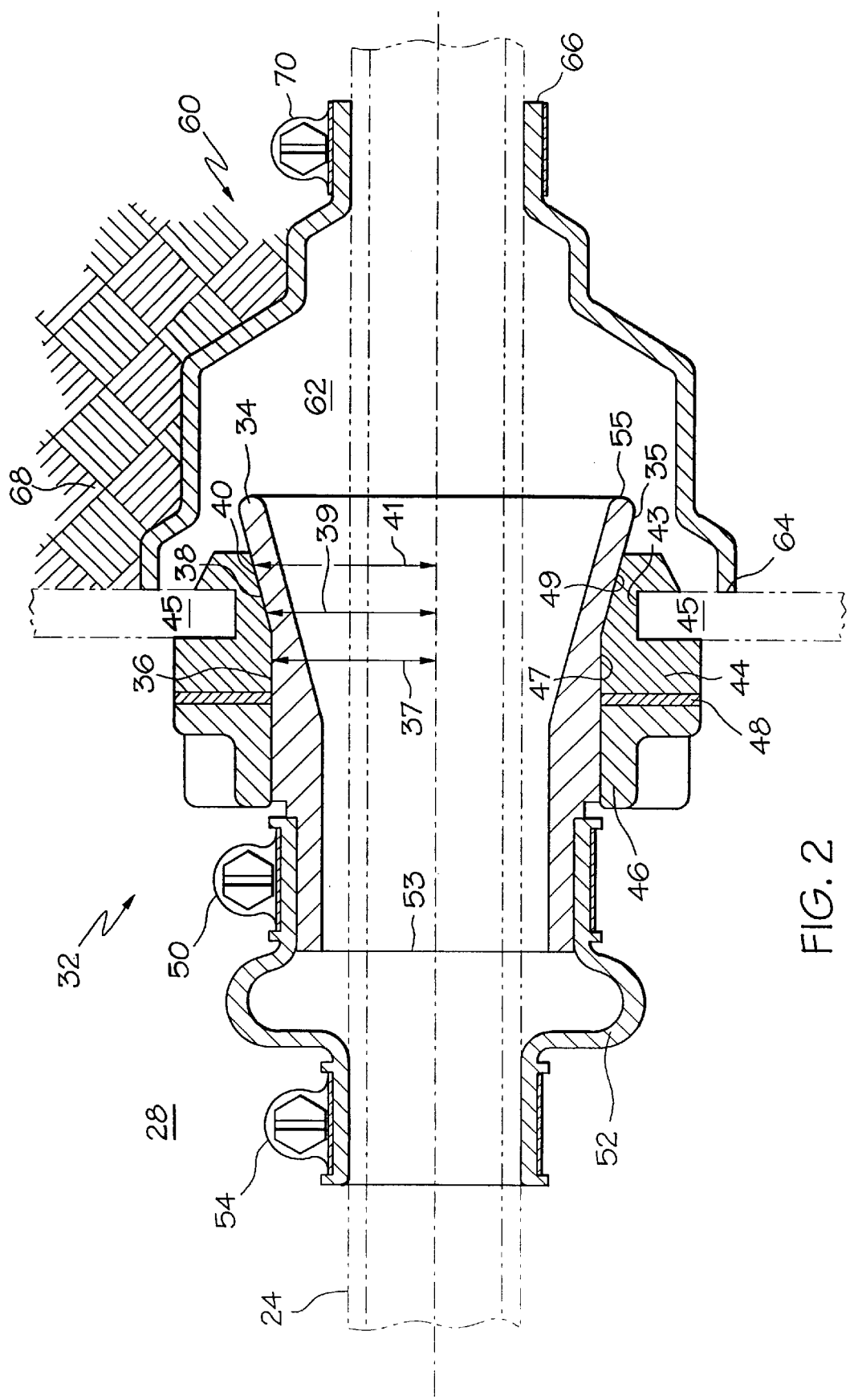
FIG. 2 is a cross-sectional view of an entry fitting and shield according to another embodiment of this invention.

FIG. 2 shows entry fitting 32 according to one embodiment of this invention. Body 34 includes surface 35 having a first portion 36, second portion 40, and transition portion 38. First portion 36 has first radius 37 which is less than second radius 41 of second portion 40. Transition portion 38 extends between first portion 36 and second portion 40 and includes a transition radius 39 which is greater than first radius 37 and less than second radius 41. According to the embodiment of entry fitting 32 shown in FIG. 2, first portion 36 generally defines a cylindrical exterior surface, and transition portion 38 and second portion 40 generally define a conical portion which is conjoint with first portion 36.

Seal 44 is positioned circumferentially about body 34 and provides a sealing interface between body 34 and wall 45. Seal 44 prevents fluid from exiting sump 28 and entering backfill 68. Seal 44 can comprise an elastomer or any other composition known in the art suitable for its purposes. Body 34 is rigid, and can comprise a metal or thermoplastic, in a preferred embodiment body 34 comprises a thermoset material. Entry fitting 32 also includes an axial displacement member such as nut 46 which can be threadedly engaged with an exterior threaded portion of body 34. Nut 46 can comprise the same materials as body 34. Nut 46 advances along surface 35 toward second portion 40 as it is rotated. Advancement of nut 46 urges seal 44 against transition portion 38 which in turn urges seal 44 radially outward and against wall 45. As shown in FIG. 2, if the access opening formed by wall 45 were larger than that shown in FIG. 2, entry fitting 32 need only be slightly displaced toward the interior of sump 28 to sufficiently seal the opening in conjunction with seal 44. Thus, the entry fitting according to this invention allows a single entry fitting to seal a relatively wide range of access opening diameters. As nut 46 is advanced along surface 35, seal 44 is increasingly urged radially outward by transition portion 38, achieving a wide range of sealing force. Thus, should seal 44 begin to leak after installation, nut 46 need only be further axially advanced along surface 35 to reseal the access opening, potentially eliminating a need to replace seal 44.

The wide range of adjustable sealing force achieved by entry fitting 32 according to this invention enables the use of a single size entry fitting with a relatively wide range of access opening diameters. Entry fitting 32 can also accommodate irregularly shaped access openings. Installation is relatively fast because a single nut is used to adjust the sealing force between fuel conduit 24 and wall 45.

Washer 48 can be positioned between seal 44 and nut 46 to reduce friction. Washer 48 can comprise a high density polyethylene or any other relatively low friction material.

Seal 44 can include a first interior surface such as first portion 47 which conforms to the contour of first portion 36 of surface 35. Seal 44 can also include a second interior surface such as second portion 49 which conforms to the contour of transition portion 38 of surface 35. Seal 44 preferably, but not necessarily, includes annular groove 43 for closely receiving an edge of wall 45 and surrounding the edge of wall 45 for increasing the seal contact area between seal 44 and wall 45.

Clamp 50 sealingly urges one end of boot 52 against the periphery of end 53 of body 34, and boot 54 sealingly urges the other end of clamp 52 against fuel conduit 24 to prevent fuel from entering the space between fuel conduit 24 and the interior surface of body 34.

Figure 3:
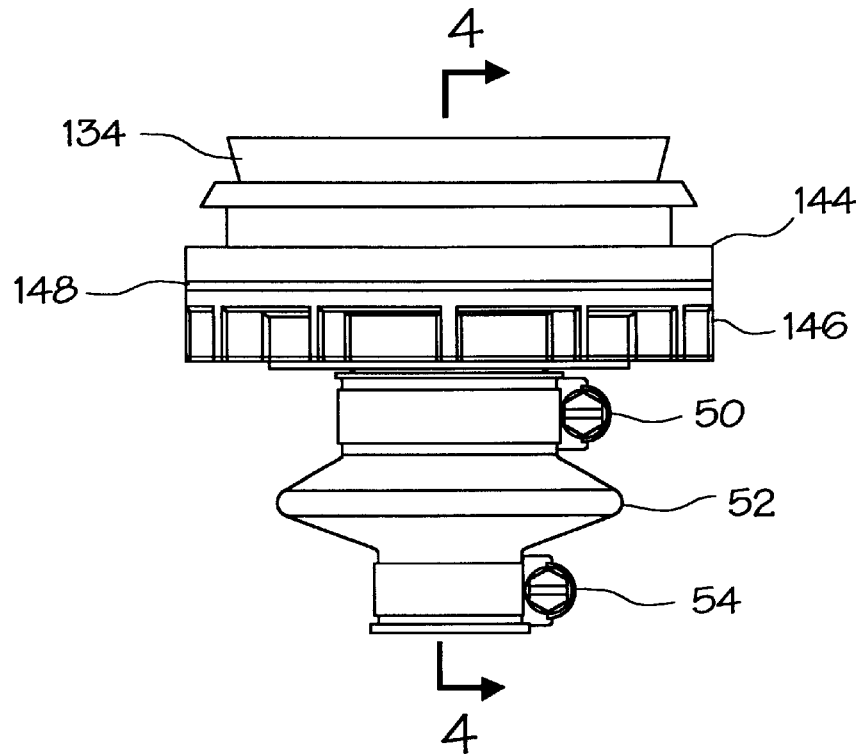
FIG. 3 is a side view of an entry fitting according to another embodiment of the invention.
Figure 4:
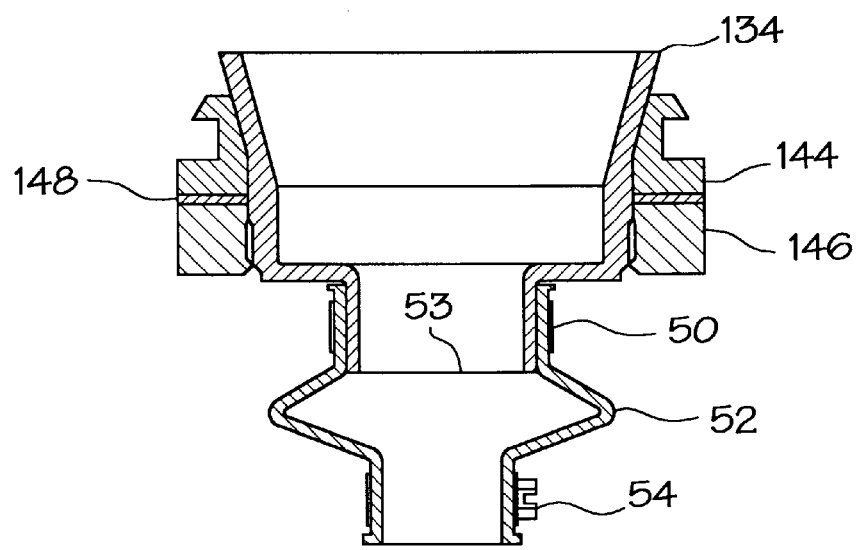
FIG. 4 is a cross-sectional view taken along line 4—4 of FIG. 3.

FIGS. 3 and 4 show entry fitting 32 according to another embodiment of this invention. As shown in FIG. 4, the diameter of the exterior surface of body 134 in the area which supports nut 146 has a larger diameter with respect to end 53 of body 134 than the entry fitting shown in FIG. 3. Correspondingly, the interior diameter of seal 144, washer 148 and nut 146, each of which is circumferentially positioned about body 134, have been increased. Such increased interior diameter allows removal of nut 146 from body 134 without requiring removal of clamp 50, boot 52 or clamp 54. This facilitates quick removal and replacement of seal 144 without needing to disturb the existing seal between clamp 50 and end 53.

Entry fitting 32 is installed in sump 28 by inserting transition portion 38 and seal 44 in the access opening formed by wall 45 and advancing nut 46 along surface 35 until sufficient sealing force between surface 35 and wall 45 is achieved. If, over time, seal 44 develops a leak, nut 46 need only be additionally rotated and advanced toward second portion 40 to increase the sealing force and reseal the access opening. If seal 44 has completely failed and requires replacement, fuel conduit 24 is disconnected from its fitting in sump 28, nut 46 is rotated in a reverse direction toward the interior of sump 28 to relieve pressure on seal 44, and is slid along with washer 48 over clamp 50, boot 52 and down the length of fuel conduit 24 and removed. Body 34 can be urged toward the exterior of sump 28 in a direction toward backfill 68 to relieve the radial force on seal 44. After body 34 is extended sufficiently into access space 62, seal 44 can similarly be slid over clamp 50, boot 52 and down the length of fuel conduit 24 and removed.

A new seal 44 is then placed over fuel conduit 24 and slid back onto body 34, followed by washer 48 and nut 46. Thus, even a complete failure of seal 44 can be fixed by replacement of a relatively inexpensive seal, rather than a new entry fitting 32. Further, replacement of seal 44 is a relatively quick process.

FIG. 2 shows shield 60 according to another embodiment of this invention. Shield 60 includes first end 64 and second end 66 spaced from first end 64. Shield 60 defines access space 62 which is intermediate first end 64 and second end 66, and which is disposed about an axial length of fuel conduit 24. Access space 62 has a diametral dimension larger than the corresponding diametral dimension of end 55 of body 34. Access space 62 also has an axial dimension sufficient to allow displacement of end 55 axially into access space 62 of shield 60. Shield 60 can comprise any suitable rigid material.

First end 64 circumscribes the access opening formed by wall 45 and is in sufficient proximity to wall 45 to prevent backfill 68 from entering access space 62. The distance between end 64 and wall 45 can vary depending upon the diameter of backfill 68. It is preferred that the distance between end 64 and wall 45 be less than the diameter of backfill 68 to prevent backfill 68 from entering access space 62.

Second end 66 circumscribes fuel conduit 24 to inhibit backfill 68 from entering access space 62 between fuel conduit 24 and shield 60. Shield 60 is removably fixed with respect to fuel conduit 24 to selectively prevent relative axial displacement between fuel conduit 24 and shield 60, and to secure the position of first end 64 with respect to wall 45. Clamp 70 radially urges first end 66 against fuel conduit 24 to prevent relative axial displacement between shield 60 and fuel conduit 24.

Access space 62 should have a sufficient axial dimension to allow sufficient displacement of end 55 of body 34 into access space 62 to allow removal of seal 44 from body 34.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A piping system, comprising:
   a containment chamber having a wall with an opening defined by opposing surfaces of the wall, the opposing surfaces of the wall being substantially parallel;
   a pipe passing through the opening to the containment chamber; and
   an entry fitting comprising:
      a body generally surrounding at least a portion of the pipe;
      a sealing interface between the pipe and the body;
      a seal adapted to provide a sealing interface between the body and the wall; and
      a force regulator associated with the body for interfacing with the seal and providing an adjustable sealing force radially between the body and the opposing surfaces of the wall,
   wherein the entry fitting is capable of cooperating with variably sized openings in the wall and is operative to provide a sealing interface between the pipe and the wall.

2. The piping system of claim 1, wherein the force regulator is part of the body, a first portion of a surface of the body having a first radius and a second portion of the surface of the body having a second radius, the second radius being greater than the first radius, and a transition portion positioned between the first portion and the second portion, and comprising the force regulator, the transition portion having a greater radius than the first portion and a smaller radius than the second portion, and extending between the first portion and the second portion for a distance which is greater than a thickness of the wall about the opening.

3. The piping system of claim 1, wherein the force regulator is axially movable relative to the seal to vary the sealing force between the body and the wall.

4. The piping system of claim 2, wherein said transition portion uniformly transitions from the first radius to the second radius.

5. A piping system comprising:
   a containment chamber having a wall with an opening;
   a pipe passing through the opening to the containment chamber; and
   an entry fitting, comprising:
      a body generally surrounding at least a portion of the pipe, and having a surface with first and second sealing areas;
      a first portion of the surface having a first radius, and a second portion of the surface having a second radius, the second radius being greater than the first radius;
      a transition portion positioned between the first portion and the second portion, the transition portion having a greater radius than the first portion and a smaller radius than the second portion, said transition portion forming at least a part of the second sealing area, and extending between the first portion and the second portion for a distance which is greater than a thickness of the wall about the opening;

a sealing interface between the pipe and the first sealing area of the body:

a seal circumferentially positioned about the body, the seal being adapted to provide a sealing interface between the second sealing area of the body and the wall; and an axial displacement member positioned about the body for urging the seal axially along the surface, whereby the transition portion urges the seal radially outward, the entry fitting being operative to provide a sealing interface between the pipe and the wall.

6. A piping system according to claim 5, wherein the seal has an annular groove, the annular groove being operative to receive an edge of the wall forming the opening.

7. A piping system according to claim 5, wherein the seal is adapted to provide the sealing interface between the second sealing area of the body and surfaces of the wall forming the opening.

8. A piping system according to claim 5, wherein the body further comprises an externally threaded portion, and the axial displacement member comprises a nut threadedly engaged with the externally threaded portion, rotation of the nut axially advancing the nut along the surface.

9. A piping system according to claim 8, further comprising a washer positioned circumferentially about the surface and positioned axially between the nut and the seal.

10. A piping system according to claim 9, wherein the transition portion and the second portion provide the surface with a frusto-conical shape.

11. A piping system according to claim 5, wherein a circumferential portion of an interior surface of the seal conforms to the contour of the transition portion.

12. A piping system according to claim 5, further comprising a boot circumferentially positioned about the body, the boot being adapted to provide the sealing interface between the first sealing area of the body and the pipe.

13. The piping system according to claim 12, further comprising a clamp circumferentially positioned about the boot, wherein the clamp urges the boot against the first sealing area of the body, and the axial displacement member and the seal have an interior diameter greater than the diameter of a circle circumscribing the clamp.

14. The piping system according to claim 5, wherein the axial displacement member is axially movable with respect to the body for urging the seal axially along the surface toward the second portion, and wherein axial movement of the seal along the transition portion is operative to vary a sealing force between the body and the wall.

15. The piping system according to claim 5, wherein the wall has a first side and a second side that is substantially parallel to the first side, and wherein, in a sealed position, the seal has a first seal portion positioned with respect to the first side of the wall and having a radius greater than a greatest radius of the opening, and the seal has a second seal portion positioned with respect to the second side of the wall and having a radius greater than the greatest radius of the opening.

16. The piping system according to claim 15, wherein the first and second seal portions are configured to substantially conform to the first and second sides, respectively, of the wall.

17. The piping system according to claim 5, wherein at least a portion of the transition portion of said surface is disposed within the opening.

18. The piping system according to claim 6, wherein the first portion of said surface is disposed substantially within the containment chamber.

19. The piping system according to claim 6, wherein the second portion of said surface is disposed substantially outside of the containment chamber.

20. The piping system according to claim 6, wherein the transition portion uniformly transitions from the first radius to the second radius.

21. The piping system according to claim 5, wherein the wall about the opening is substantially flat.

22. The piping system according to claim 5, wherein the body has first and second ends, a first portion of the pipe extending from the first end of the body into the containment chamber and a second portion of the pipe extending from the second end of the body outside of the containment chamber, the first portion of the pipe being integral with the second portion of the pipe.

23. The piping system according to claim 5, wherein the second portion of the body is capable of passing through the opening.

24. A secondarily contained piping system comprising:

a containment sump having a wall with an opening;

a pipe passing through the opening to the containment sump, and made of a material suitable for carrying hydrocarbon fuel; and an entry fitting, comprising:

a body having a throughbore, and an exterior surface with first and second sealing areas, the exterior surface of the body having a cylindrical portion and a conical portion, the cylindrical portion being adjacent the conical portion and the conical portion forming at least a part of the second sealing area, the conical portion extending from the cylindrical portion for a distance which is greater than a thickness of the wall about the opening, and the pipe being at least partially received in the throughbore;

a sealing interface between the pipe and the first sealing area of the body;

a seal circumferentially disposed about the body, the seal being adapted to provide a sealing interface between the second sealing area of the body and the wall; and an axial displacement member axially movable with respect to the cylindrical portion for urging the seal axially along the body, axial movement of the seal along the conical portion being operative to vary a sealing force between the body and the wall, and the entry fitting being operative to provide a sealing interface between the pipe and the wall.

25. The piping system according to claim 24, further comprising a first internal portion of the seal shapingly conforming to the cylindrical portion and a second internal portion of the seal shapingly conforming to the conical portion.

26. The piping system according to claim 24, wherein the seal has an annular groove, the annular groove being operative to receive an edge of the wall forming the opening.

27. The piping system according to claim 24, wherein the wall has a first side and a second side that is substantially parallel to the first side, and wherein, in a sealed position, the seal has a first seal portion positioned with respect to the first side of the wall and having a radius greater than a greatest radius of the opening, and the seal has a second seal portion positioned with respect to the second side of the wall and having a radius greater than the greatest radius of the opening.

28. The piping system according to claim 24, wherein the cylindrical portion of said surface is disposed substantially within the containment sump.

29. A piping system comprising:
a containment chamber having a wall with an opening;
a pipe passing through the opening and into the containment chamber; and
an entry fitting, comprising:
a body generally surrounding at least a portion of the pipe, and having a surface with first and second sealing areas;
a first portion of the surface having a first radius, and a second portion of the surface having a second radius, the second radius being greater than the first radius;
a transition portion positioned between the first portion and the second portion, the transition portion having a greater radius than the first portion and a smaller radius than the second portion, said transition portion forming at least a part of the second sealing area;
a boot circumferentially positioned about the body, the boot being adapted to provide a sealing interface between the first sealing area of the body and the pipe;
a clamp circumferentially positioned about the boot, wherein the clamp urges the boot against the first sealing area of the body;
a seal circumferentially positioned about the body and having an interior diameter greater than the diameter of a circle circumscribing the clamp, the seal being adapted to provide a sealing interface between the second sealing area of the body and the wall; and
an axial displacement member positioned about the body for urging the seal axially along the surface and having an interior diameter greater than the diameter of a circle circumscribing the clamp, whereby the transition portion urges the seal radially outward, the entry fitting being operative to provide a sealing interface between the pipe and the wall.

30. A piping system comprising:
a containment chamber having a wall with an opening, the wall having a first side and a second side that is substantially parallel to the first side;
a pipe passing through the opening and into the containment chamber; and
an entry fitting, comprising:
a body generally surrounding at least a portion of the pipe, and having a surface with first and second sealing areas;
a first portion of the surface having a first radius, and a second portion of the surface having a second radius, the second radius being greater than the first radius;
a transition portion positioned between the first portion and the second portion, the transition portion having a greater radius than the first portion and a smaller radius than the second portion, said transition portion forming at least a part of the second sealing area;
a sealing interface between the pipe and the first sealing area of the body;
a seal circumferentially positioned about the body, the seal being adapted to provide a sealing interface between the second sealing area of the body and the wall, and wherein, in a sealed position, the seal has a first seal portion positioned with respect to the first side of the wall and having a radius greater than a greatest radius of the opening, and the seal has a second seal portion positioned with respect to the second side of the wall and having a radius greater than the greatest radius of the opening; and
an axial displacement member positioned about the body for urging the seal axially along the surface, whereby the transition portion urges the seal radially outward, the entry fitting being operative to provide a sealing interface between the pipe and the wall.

31. The piping system according to claim 30, wherein the first and second seal portions are configured to substantially conform to the first and second sides, respectively, of the wall.

32. A secondarily contained piping system comprising:
a containment sump having a wall with an opening, the wall having a first side and a second side that is substantially parallel to the first side;
a pipe passing through the opening and into the containment sump, and made of a material suitable for carrying hydrocarbon fuel; and
an entry fitting, comprising:
a body having a throughbore, and an exterior surface with first and second sealing areas, the exterior surface of the body having a cylindrical portion and a conical portion, the cylindrical portion being adjacent the conical portion and the conical portion forming at least a part of the second sealing area, and the pipe being at least partially received in the throughbore;
a sealing interface between the pipe and the first sealing area of the body;
a seal circumferentially disposed about the body, the seal being adapted to provide a sealing interface between the second sealing area of the body and the wall, and wherein, in a sealed position, the seal has a first seal portion positioned with respect to the first side of the wall and having a radius greater than a greatest radius of the opening, and the seal has a second seal portion positioned with respect to the second side of the wall and having a radius greater than the greatest radius of the opening; and
an axial displacement member axially movable with respect to the cylindrical portion for urging the seal axially along the body, axial movement of the seal along the conical portion being operative to vary a sealing force between the body and the wall, and the entry fitting being operative to provide a sealing interface between the pipe and the wall.

33. The piping system according to claim 22, wherein the cylindrical portion of said surface is disposed substantially within the containment sump.

34. The piping system of claim 1, wherein the opening comprises a generally cylindrical opening.

35. A piping system according to claim 5, wherein the opening is defined by opposing surfaces of the wall, the opposing surfaces of the wall being substantially parallel.

36. A piping system according to claim 5, wherein the opening comprises a generally cylindrical opening.

37. The piping system according to claim 24, wherein the opening is defined by opposing surfaces of the wall, the opposing surfaces of the wall being substantially parallel.

38. The piping system according to claim 37, wherein the opening comprises a generally cylindrical opening.

39. The piping system of claim 1, wherein the adjustable sealing force is provided in a direction that is substantially norm to the opposing surfaces of the wall.

40. The piping system of claim 39, wherein the adjustable sealing force is provided against the opposing surfaces of the wall.

* * * * *

UNITED STATES PATENT AND TRADEMARK OFFICE
CERTIFICATE OF CORRECTION

PATENT NO. : 6,224,115 B1
DATED : May 1, 2001
INVENTOR(S) : Lawrence R. Blasch et al.

It is certified that error appears in the above-identified patent and that said Letters Patent is hereby corrected as shown below:

Column 8, claim 18,
Line 1, replace "6" with -- 5 --.

Column 8, claim 19,
Line 4, replace "6" with -- 5 --.

Column 8, claim 20,
Line 7, replace "6" with -- 5 --.

Column 10, claim 33,
Line 45, replace "22" with -- 32 --.

Column 10, claim 39,
Line 62, replace "norm" with -- normal --.

Signed and Sealed this

Eighteenth Day of December, 2001

Attest:

*Attesting Officer*

JAMES E. ROGAN
*Director of the United States Patent and Trademark Office*